(12) United States Patent
Tessler et al.

(10) Patent No.: US 6,289,090 B1
(45) Date of Patent: *Sep. 11, 2001

(54) DELIVERY OF DISPLAY INFORMATION TO THE CALLER IN AN ADVANCED INTELLIGENT NETWORK

(75) Inventors: Michael Tessler, Memphis, TN (US); Pierre Belzile, Lachine; Charles Meubus, Westmount, both of (CA)

(73) Assignee: Nortel Networks Limited, Montreal (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/773,494

(22) Filed: Dec. 23, 1996

(51) Int. Cl.$^7$ .................................................. H04M 3/42
(52) U.S. Cl. ..................... 379/207; 379/93.17; 379/230
(58) Field of Search .............................. 379/93.17, 93.23, 379/93.25, 114, 115, 130, 140, 201, 202, 207, 229, 231, 354, 355, 213, 230, 210, 274, 233, 214

(56) References Cited

U.S. PATENT DOCUMENTS

| | | | |
|---|---|---|---|
| 5,119,415 | * 6/1992 | Aoyama | 379/207 |
| 5,345,502 | 9/1994 | Rothenhofer . | |
| 5,408,518 | 4/1995 | Yunoki . | |
| 5,416,831 | 5/1995 | Chewning, III et al. . | |
| 5,420,914 | * 5/1995 | Blumhardt | 379/114 |
| 5,452,340 | * 9/1995 | Englebeck et al. | 379/88.03 |
| 5,457,738 | * 10/1995 | Sylvan | 379/201 |
| 5,473,630 | * 12/1995 | Penzias et al. | 379/115 |
| 5,499,290 | * 3/1996 | Koster | 379/242 |
| 5,566,235 | * 10/1996 | Hetz | 379/201 |
| 5,606,602 | * 2/1997 | Johnson et al. | 379/115 |
| 5,608,788 | * 3/1997 | Demlow et al. | 379/142 |
| 5,724,411 | * 3/1998 | Eisdorfer et al. | 379/93.23 |
| 5,754,641 | * 5/1998 | Voit et al. | 379/354 |
| 5,771,279 | * 6/1998 | Cheston, III et al. | 379/93.17 |
| 5,790,173 | * 8/1998 | Strauss et al. | 348/7 |

FOREIGN PATENT DOCUMENTS

| | | |
|---|---|---|
| 0 613 280 A1 | 2/1994 | (EP) . |
| 0 696 146 A2 | 7/1995 | (EP) . |
| WO 93/18606 | 9/1993 | (WO) . |
| WO 96/08909 | 3/1996 | (WO) . |

OTHER PUBLICATIONS

Berman, R.K. et al., "Evolvability of the Advanced Intelligent Network," Denver ICC 91 Conference Record, vol. 2 of 3, pp. 21.1.1–21.1.5 (Jun. 23–26, 1991).

(List continued on next page.)

Primary Examiner—Fan Tsang
Assistant Examiner—Roland G. Foster
(74) Attorney, Agent, or Firm—Foley & Lardner (57) ABSTRACT

The invention provides a method and a system for selectively delivering information to callers in an AIN environment. In accordance with the method the service switching point to which is connected the terminal equipment of the caller monitors the condition of the telephone line to detect an AIN trigger, such as an off-hook event among other possibilities. When such event occurs, the service switch point formulates a message query. The query is routed to a service control point via one or more service transfer points, that holds knowledge of the service subscribed by the caller and the information to be displayed for this service. The service control point analyzes the request and assembles the appropriate response. That response is then returned to the service switch point that formats it properly and delivers it to the terminal equipment of the caller. In one embodiment the information delivery is effected during call establishment. In a variant, information is delivered while no call is being attempted.

28 Claims, 5 Drawing Sheets

OTHER PUBLICATIONS

"LSSGR: Voiceband Data Transmission Interface Section 6.6," Bellcore, Generic Requirements GR–30–CORE, Issue 1, pp. 2.1–2.22 (Dec. 1994).

"AINGR: Switching Systems—SSP Processing of SCP/Adjunct Messages," Bellcore, Generic Requirements GR–1298–CORE, Issue 3, pp. 5–5–5–21 (Jul. 1996).

"AINGR: Switching Systems—SSP Processing of SCP/Adjunct Messages," Bellcore, Generic Requirements GR–1298–CORE, Issue 3, pp. 5–33–5–43 (Jul. 1996).

"AINGR: Switching Systems—SSP Processing of SCP/Adjunct Messages," Bellcore, Generic Requirements GR–1298–CORE, Issue 3, pp. 5–50–5–57 (Jul. 1996).

"AINGR: Switch—Service Control Point SCP/Adjunct Interface," Bellcore, Generic Requirements GR–1299–CORE, Issue 3, pp. 5–49–5–50, pp. 5–73–5–74, and pp. 6–64–6–65 (Jul. 1996).

* cited by examiner

DELIVERY OF DISPLAY INFORMATION TO THE CALLER IN AN ADVANCED INTELLIGENT NETWORK

BACKGROUND OF THE INVENTION

This invention relates generally to the delivery of information to the caller in the public switched network environment following an AIN trigger processing. The present invention provides a method and a system for coordinating and delivering the information between the public switched network and customer premises equipment (CPE).

FIELD OF THE INVENTION

In prior art, focus has been on the delivery of information to the called party to allow the called party to determine the caller and the nature of the call. For example, public switched telephone networks currently provide the delivery of both name and number to subscribers who have subscribed to this service. The caller can receive the name and/or number information from the public switched network and display the information using appropriate terminal equipment. There is, however, no possibility with currently existing PSTN equipment and protocols to forward back to the calling party messages that provide information relating to the call such as name of called party, billing rate or any other suitable information. Stated otherwise, the delivery of information with present day systems is unidirectional, always toward the called party and never toward the calling party. This presents a disadvantage the present invention aims to alleviate.

SUMMARY AND OBJECTIVES OF THE INVENTION

An object of the present invention is to provide a novel method and system permitting delivery of information, preferably display information to the calling party in an AIN environment.

As embodied and broadly described herewith, the present invention provides a method for delivering selected information to a caller connected to an AIN type network that includes:

- a central office switch having service switching point capability to which a terminal equipment of the caller is connected;
- a service control point capable of exchanging data with said service switching point;

said method comprising the steps of:

- monitoring at said central office switch a condition of said terminal equipment to detect a request for delivering data to said terminal equipment through AIN interaction;
- formulating at said central office switch a query request in accordance with said request for delivering data;
- forwarding said query request to said service control point;
- processing said query request at said service control point and generating a response message;
- forwarding said message to said central office switch;
- delivering to said terminal equipment data in dependence of a contents of said message.

In a preferred embodiment the above defined method is implemented in an AIN environment, an infrastructure proposed by Bellcore which is being put in place and used by public switched network service providers to deploy new services quickly and effectively. The AIN infrastructure simplifies the design and implementation of new telecommunication services by defining a set of network elements, messages and call models. This allows for many services to be constructed using these standard building blocks and deployed quickly and effectively to subscribers. The AIN architecture is outlined by Berman et al in the ICC '91 Proceedings, Volume 2 at pages 21.1.1 to 21.1.5, June 1991. The contents of this publication are incorporated herein by reference. The existing AIN, however, does not provide for the display of information to the caller during call establishment or during caller interaction controlled by the service logic executed on the service control point (SCP).

Another component employed in a preferred embodiment of the invention is the signaling system network number 7 (SS#7) network that has been widely deployed as a massaging network between network elements. Within the public switched network this has enabled applications like the delivery of calling name and number. The network uses the signaling system network number 7 (SS#7) to transmit the calling number from the originator to the terminating office. Software which resides at the terminating office receives the information and prepares the information to be transmitted to the terminating customer premise equipment (CPE). The CPE would receive this information and display the number and/or name on the CPE. The AIN signaling messages used to convey information between the service switching point (SSP) and signaling control point (SCP) are also exchanged through the SS#7 network To support many of these new services, a new generation of CPE has been developed to provide better interaction between the network and the CPE. This CPE has the added capability to receive information from the network and display it to the caller. One widely used application is again the delivery of calling name and number. Examples of these new CPE are screen-based sets such as those conforming to Bellcore document GR-30-CORE, "LSS-Voiceband Data Transmission Interface", Section 6.6, Issue 1, Dec 1994, and CPE supporting the ISDN access protocol as described in GR-2824-CORE Generic Requirements for Integrated Customer Advanced Networking (ICAN) Calling Number Identification (ICAN CNIS). This document is incorporated herein by reference. The methods described in this invention use the aforementioned methods and others for delivery of information to the CPE.

In accordance to the principles of the present invention, information is delivered to the caller, enabling beneficial applications. Three examples illustrate the benefits accruing from the present invention:

The first is the delivery to the caller of called party name and/or number during the establishment of a call. This new capability allows the caller to determine the name of the person that was called. Another benefit is to allow the caller to verify that the intended number and destination was in fact the number that was dialed, allowing a reduction in misdialled calls. Another benefit is to allow others to see and determine with who the caller is in conversation, for example, in a hands-free conference situation.

The second sample application is the delivery of rate information during call establishment. The application of this method would allow callers to get a display of the rate that would be in effect during the particular call for the number dialed. The caller could accept the rate and continue with the call, or reject the rate and abort the call. The method described contains the ability for the user to confirm acceptance or reject the call. The benefit to users is to have the knowledge of the rate being used for the call prior to making the call.

Both of these prior examples demonstrate the use of these methods during call establishment. Another possibility under the present inventive concept is to deliver information to the caller when no call establishment is in progress. An example would be the updating of the personal profile of a caller. The user would interact with the network to update his personal information, for example forwarding number, feature subscription, personal identification numbers (PINs), etc.

Most preferably, the information that is delivered to the caller is designed to be visually perceptible. In other words, the information is directed to a display screen and may be in the form of a message providing the name or telephone number of the called party, billing rate information, a menu structure allowing to establish a dialog or interaction with the caller, among many other possibilities. In a specific embodiment, the display information may consists solely or in part of executable software instructions that deliver a specific functionality to the terminal equipment of the customer. Application-executable software encompasses Java applets, Javascript, ADSI scripts, etc., among many other possibilities. Java applets, for example, may be used to create sophisticated graphics on the display screen, such as moving logos or games.

The present invention encompasses two specific embodiments, among several other possible realizations. The first embodiment relates to data delivery to the caller during call establishment, in other words, the caller receives the information while a telephone call is being completed or it is underway. Typically, this embodiment is utilized in instances where the delivered information is specific to the call in progress. The second embodiment covers situations where information is being delivered when no call is being established. This variant is used when the type of information delivered is call independent, such as for example marketing information or any other data that is not related to a call.

In a specific example under the first embodiment, users with the service would have an AIN trigger provisioned on their lines. As part of provisioning this new service, the user would specify the type of information to be displayed (and the format). In addition, the user would specify if confirmation is required to proceed with the call and the method of the confirmation.

As the caller goes off hook, the call processing software within the service switching point (SSP) detects this condition as an AIN trigger and then collects the digits of the called party. It should be observed that AIN triggers may occur at different steps of the call model, the off-hook condition being only one of them. The SSP then formulates a request message that solicits the information that will be displayed on the CPE of the caller. The SSP then sends this request message to a service control point (SCP) that contains the relevant information for this service.

The message is sent using the signaling system network number 7 (SS#7) network and relayed via the service transfer points (STP) to the appropriate SCP. The SCP maps the number dialed along with caller's number to the information that is to be displayed and retrieves this information from its database. The SCP then formulates the appropriate response message and returns the message to the SSP via the same SS#7 signaling network.

Once the message reply is received by the SSP, the SSP decodes the message and relates this information to a response processor with the AIN. This response processor examines the information returned from the SCP, the line attribute data and determines what information will be displayed and the format of this data. The response processor then provides the local central office display software the information to be displayed and the format. The display software using the signaling path between the local central office and the CPE delivers the display information to the caller.

If the user has configured the service without confirmation, the response processor continues with normal call processing once the processor has received an indication that the message has been successfully processed by the SCP. If the user has configured the service with confirmation, the response processor waits for the correct confirmation sequence before proceeding with normal call processing. If the user does not enter the correct confirmation sequence within the predefined time-out the call is terminated. In the AIN environment this could be accomplished by relaying the entered digits (or lack of digits within a time period) to the SCP which then decides that the call should not be allowed to proceed. Another possibility is to delegate the acceptance logic to the SSP with a view of reducing massaging/load to the SCP.

Once the caller returns to the on-hook state the call would terminate as controlled by normal or usual call processing for the type of call.

Under the second embodiment of the invention an example of the service that is not associated with a call is described as follows;

Users with this service could have an AIN trigger provisioned on their lines. As part of provisioning this new service, the user would specify the type of information to be displayed (and the format).

As the caller goes off hook, the call processing software within the service switching point (SSP) detects this condition. The application may or may not need to collect digits from the user, depending on the type of AIN trigger provisioned on the line. The SSP then formulates a request message that solicits the information that will be displayed on the CPE of the caller. The SSP then sends this request message to a service control point (SCP) that contains the relevant information for this service. This message is sent using the signaling system network number 7 SS#7) network and relayed via the service transfer points (STP) to the appropriate SCP.

The SCP maps the subscriber's number to the information that is to be displayed and retrieves this information from its database. The SCP then formulates the appropriate response message and returns the message to the SSP via the same SS#7 signaling network.

Once the message reply is received by the SSP, the SSP decodes the message and relates this information to the response processor with the AIN. This response processor examines the information returned from the SCP, the line attribute data and determines what information will be displayed and the format of this data. The response processor then provides the new local central office display software with the information to be displayed and the format. The display software using the signaling path between the local central office and the CPE delivers the display information to the caller.

If input from the user is required to complete the transaction, the caller enters the appropriate input (in the absence of input a time-out is generated), the input is formatted in SCP language at the SSP and delivered to the SCP. The interaction between the caller and the application residing on the SCP can continue with a series of similar interactions as described above.

As embodied and broadly described herein the invention further provides an AIN telephone signaling network permitting delivery of information to a terminal equipment of a particular caller, said AIN telephone signaling network, comprising:

a central office switch having a service switching point capability;

a plurality of terminal equipments connected to said central office switch;

a service control point connected to said central office switch and capable of exchanging data with said central office switch;

means at said central office switch for detecting a condition of a particular terminal equipment indicative of a request for receiving data;

means at said central office switch for formulating a query request to said service control point;

means at said service control point for processing said query request and for generating a response message;

means at said service switching point for processing said message and delivering to the terminal equipment data in dependence of a contents of said message.

As embodied and broadly described herein the invention further provides method for displaying a name of a called party on a telephone set including a display screen, said telephone set being connected to an AIN type network that includes:

a central office switch having service switching point capability to which said telephone set is connected;

a service control point capable of exchanging data with said service switching point;

said method comprising the steps of:

monitoring at said central office switch a condition of said telephone set to detect a request for delivering data to said terminal equipment through AIN interaction;

formulating at said central office switch a query request in accordance with said request for delivering data, said query request including an identifier of a telephone set associated with the called party;

forwarding said query request to said service control point;

receiving said query request at said service control point that includes a database containing a plurality of identifiers of telephone sets related to corresponding subscriber names;

searching said database to locate an identifier corresponding to said identifier of a telephone set associated with the called party;

extracting from said database a subscriber name corresponding to said identifier of a telephone set associated with the called party;

formulating a response message including data representative of the subscriber name extracted from said database;

forwarding said message to said central office switch;

displaying on said display screen the subscriber name associated with the called party.

As embodied and broadly described herein the invention further provides a system for displaying a name of a called party on a telephone set including a display screen, said telephone set being connected to an AIN type network that includes:

a central office switch having service switching point capability to which said telephone set is connected;

a service control point capable of exchanging data with said service switching point;

said system comprising:

means for monitoring at said central office switch a condition of said telephone set to detect a request for delivering data to said terminal equipment through AIN interaction;

means for formulating at said central office switch a query request in accordance with said request for delivering data, said query request including an identifier of a telephone set associated with the called party;

means for forwarding said query request to said service control point;

means for receiving said query request at said service control point, said service control point including a database containing a plurality of identifiers of telephone sets related to corresponding subscriber names;

means for searching said database to locate an identifier corresponding to said identifier of a telephone set associated with the called party;

means for extracting from said database a subscriber name corresponding to said identifier of a telephone set associated with the called party;

means for formulating a response message including data representative of the subscriber name extracted from said database;

means for forwarding said message to said central office switch and causing the subscriber name associated with the called party to be displayed on said display screen.

DESCRIPTION OF PREFERRED EMBODIMENTS

Figure 1:
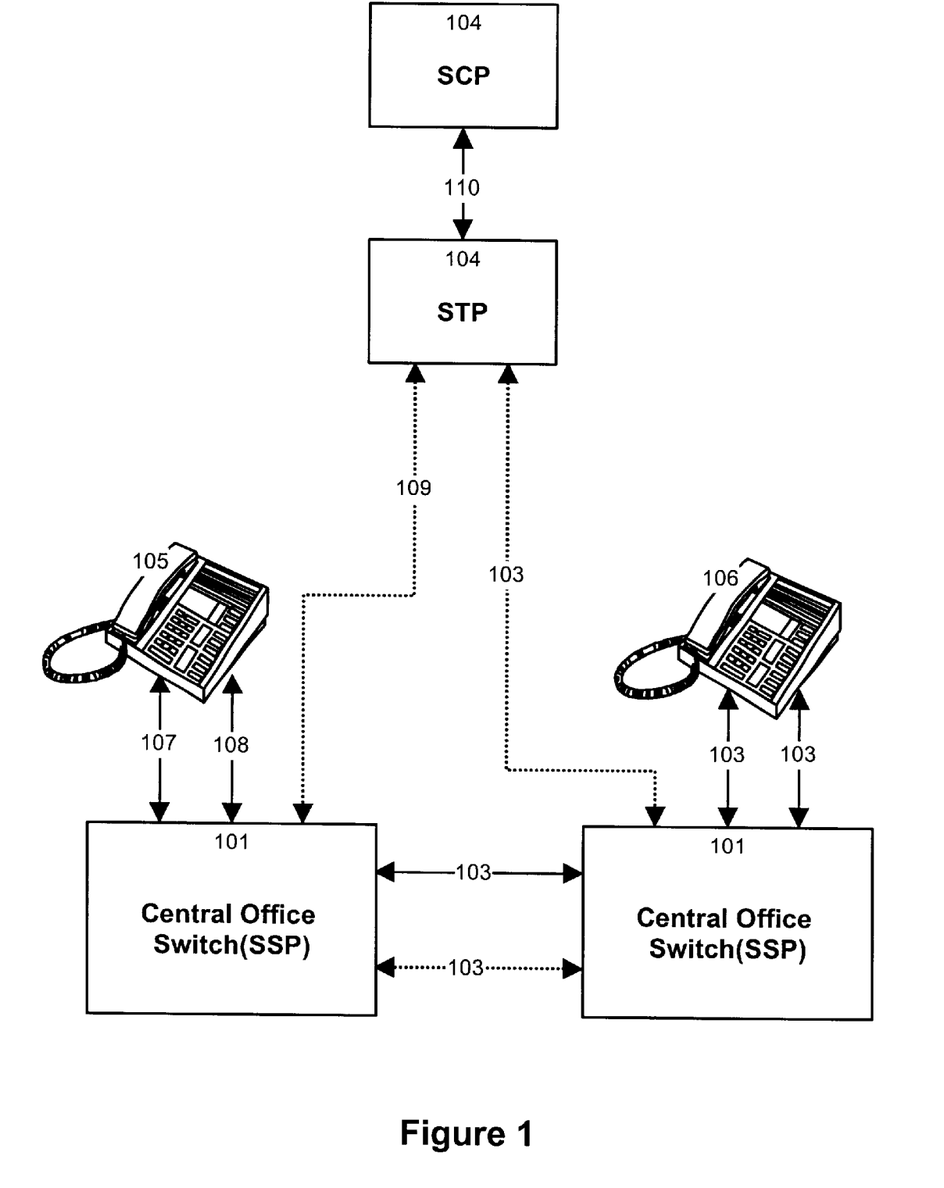
FIG. 1 is a simplified block diagram showing an arrangement of CPE interconnected with a switched telecommunications network for illustrating the operation of the invention.

FIG. 1 illustrates schematically the network elements involved in the operation of the invention. That drawing broadly depicts an end-to-end telecommunication system made up of a customer premise equipment (CPE) 105 having an interconnection 107 and 108 to a central office switch 101 located in a public switched telephone network. Interconnections 107 and 108, respectively, identify the voice path channel(s) and data link(s) between the CPE 105 and central office switch 101. Although those interconnections are shown as being separate they may be implemented over the same physical channel.

The central office switch 101 is operational as a service switching point (SSP) which, for AIN processing, means that this switch is set up to detect call processing triggers that invoke intelligent network call processing services. A service control point (SCP) 104 and elements of a common channel signaling system support the AIN operations that are carried out within central offices 101. The elements of the signaling system of immediate interest are the signal transfer point (STP) and connecting data links (109, 110). Data link 109 connects switches 101 to the STP 102; data link 110 connects STP 102 to SCP 104. The STP 102 is a node within the signaling network to facilitate the transfer of signaling messages within the signaling system.

All subscribers of the services enabled by this invention (CPE 105 as an example) are assigned one or more AIN triggers in the central office 101 using known AIN capabilities. Service specific information which varies based on the subscribed services is stored in a database at the SCP 104 site. Examples of this information are name databases, service subscription data, rate tables, etc. In essence, the SSP capable central office switch 101 has only knowledge that service is to be provided, while the SCP holds the knowledge of the service subscribed by the caller and the information to be displayed for this service.

Figure 2:
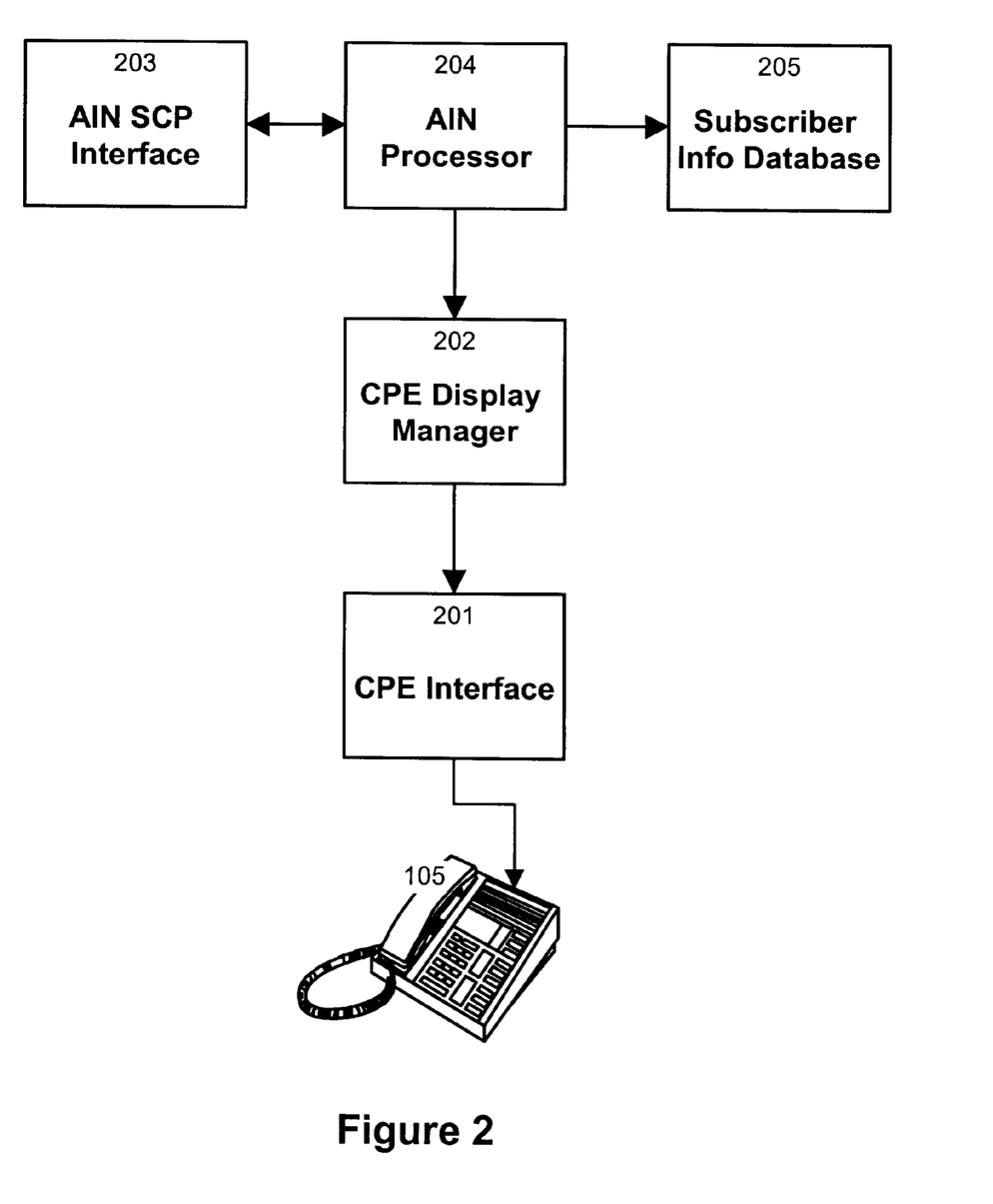
FIG. 2 is a simplified block diagram of the system in the central office switch involved in carrying out the call processing in accordance with the invention.

The structure of the control system in the central office switch 101 is illustrated in FIG. 2. The system includes an AIN response processor connected to a subscriber information database 205. An AIN SCP interface 203, connected to the AIN processor 204 constitutes a gateway through which AIN queries or requests are delivered to the SCP 104. The AIN processor 204 is also connected to a CPE display manager 202 that in turn, connects with a CPE interface 201. The function of the display manager 202 and the interface 201 is to control the format and delivery of the information supplied to the CPE 105.

Figure 3:
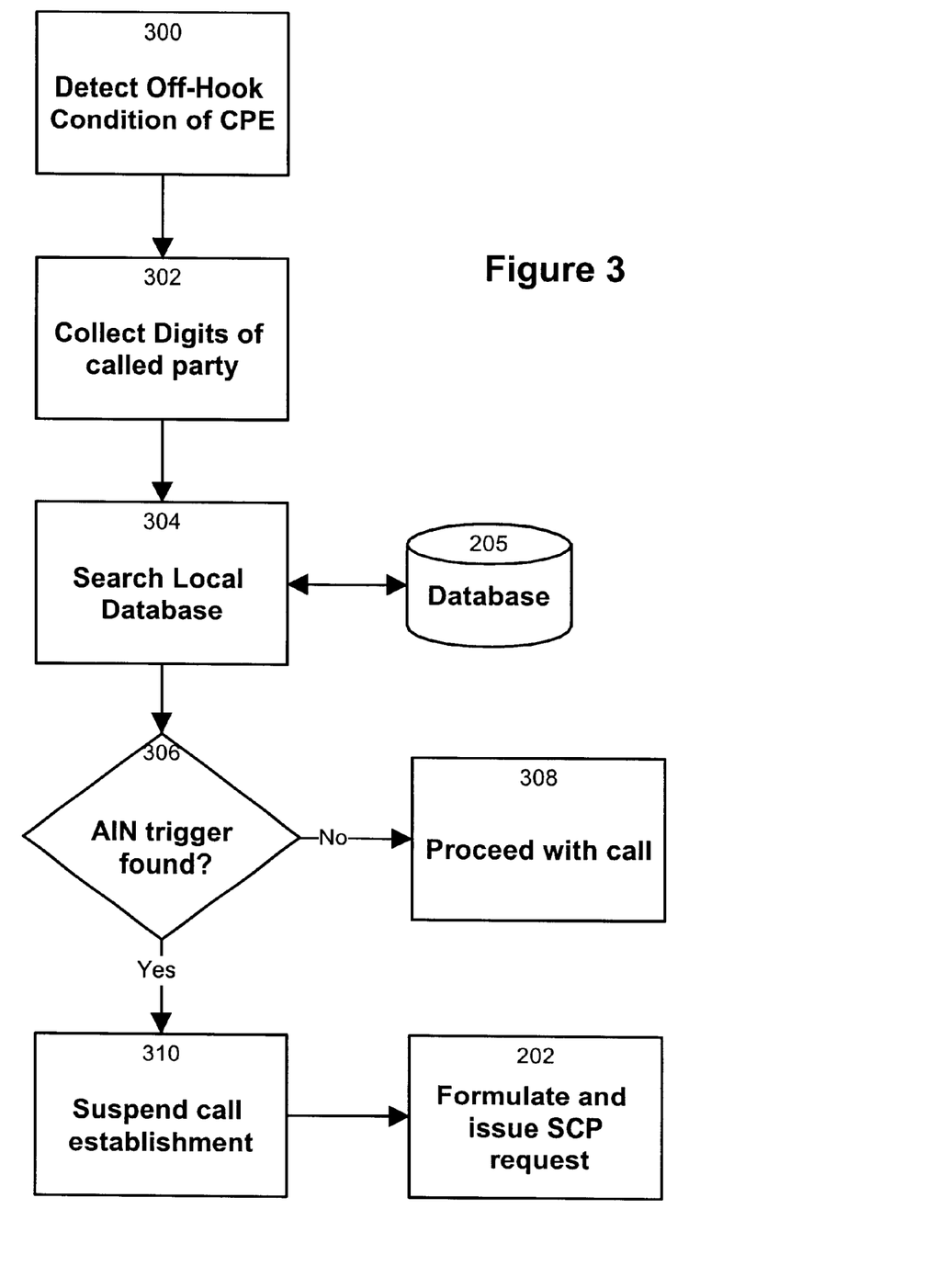
FIG. 3 is a flow chart illustrating the events occurring in the central office switch when the customer premises equipment goes off-hook.

As depicted in FIG. 3, during call processing, the SSP capable switch 101 detects at step 300 the off-hook condition of the CPE 105 and collects the dialed digits at step 302. At steps 304, 306 the local database is inspected to determine if AIN services are required for this subscriber (AIN trigger). If no AIN trigger is found in the database for the subscriber the call proceeds normally as illustrated at step 308. On the other hand, if an AIN trigger exists, the AIN processor then formulates at step 310 a query that is sent to the SCP 104 through interface 203 (Please refer to FIGS. 1 and 2). The query contains sufficient information to identify the calling subscriber (e.g., the directory number associated with terminal 105) along with any other data necessary to complete the transaction.

Figure 4:
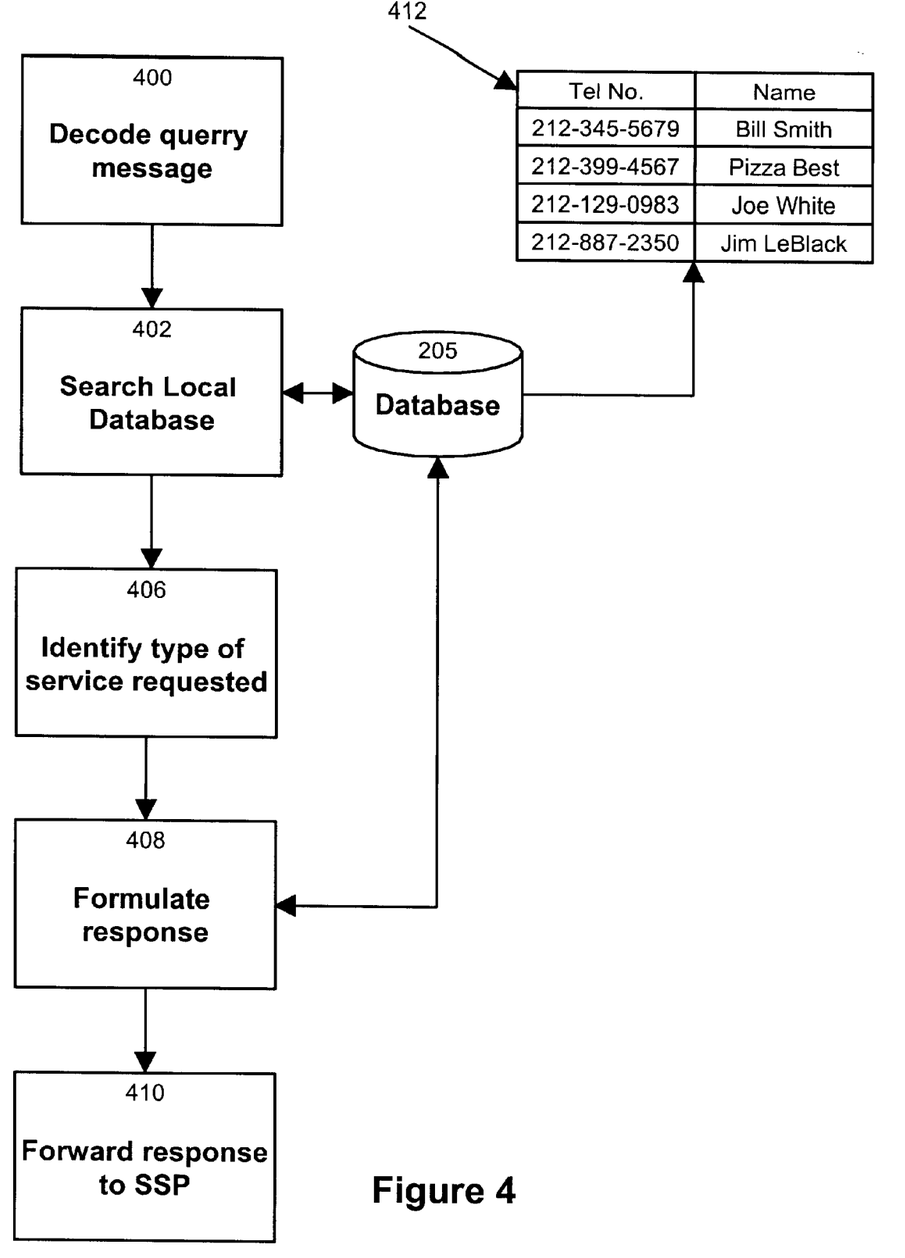
FIG. 4 is a flow chart illustrating the events occurring in the service control point when a query request is received.

Referring back to FIG. 1, the AIN query is routed to the SCP 104. Routing of this message may encounter one or several STP's such as STP 102. The flow chart at FIG. 4 illustrates the sequence of steps occurring when the query is received at the SCP 104. Upon reception of the AIN query, the SCP 104 decodes it at step 400 and accesses at step 402 its subscriber database 404 to determine at step 406 the services which are subscribed by the caller. The subscriber may have access to several of these services. In these instances, the SCP 104 would select the appropriate service based on selected criteria such a time of day, called number, etc. As discussed above, one of those services may provide the display of the called party as a call is established (e.g., towards CPE 106) or may engage the caller in a service interaction. If the service activated in the SCP 104 needs to deliver the name of the called party to the display of CPE 105 while establishing the call, the name of the called party is retrieved at step 408 from the database 404 on the basis of the digits contained in the query request. This operation is illustrated by the table 412. At step 410 the response is forwarded back to the central office switch 101. The response contains routing information and the display information. This routing information is stored as described in GR-1298. The display information, currently not supported in GR-1298 in routing message Analyze_Route, can be carried in the same TCAP message and same TCAP component using either a new AIN 0.2 parameter or parameter Display_Text as specified in GR-1299. Alternatively, the display information could also be transmitted to the central office switch 101 using another TCAP message or an additional TCAP component. In all cases, the TCAP transaction is closed and the SCP 104 service is terminated.

In a specific example, the database 404 contains a table establishing a relationship between the telephone dialed by the caller (this information is available in the query message) and the name corresponding to this telephone number. In querying the database 404 the SCP 104 locates the name of the called party corresponding to the number entered by the caller on the CPE 105 and embeds this information in the response message that is sent back to the central office 101. This, of course is only an example as in reality the database could contain a number of other types of information depending upon the range of services that the SCP 104 provides and the particular ones of those services to which the calling party has subscribed. Another example of service is rate of billing for a particular call. The SCP 104 determines from the database 404 what is the rate for the call in terms of amount of money per time unit on the basis of the called number. This information is then included in the response message and sent back to the central office 101.

The information that can be transmitted in this fashion from SCP 104 to the central office switch 101 could include: rate information for toll or metered calls, name of the called party, marketing and promotional messages, time of day, date, etc. The format of the transmitted information can be simple text or a more advanced format based on the capabilities of the caller's terminal 105. For example, graphical information and applets executable by the terminal (e.g., Java) could be transmitted in the same fashion if supported by the terminal. Applets can be used for displaying a rotating banner on the set, handling scrolling of long messages (e.g. menus) on sets with a limited display area, etc.

Figure 5:
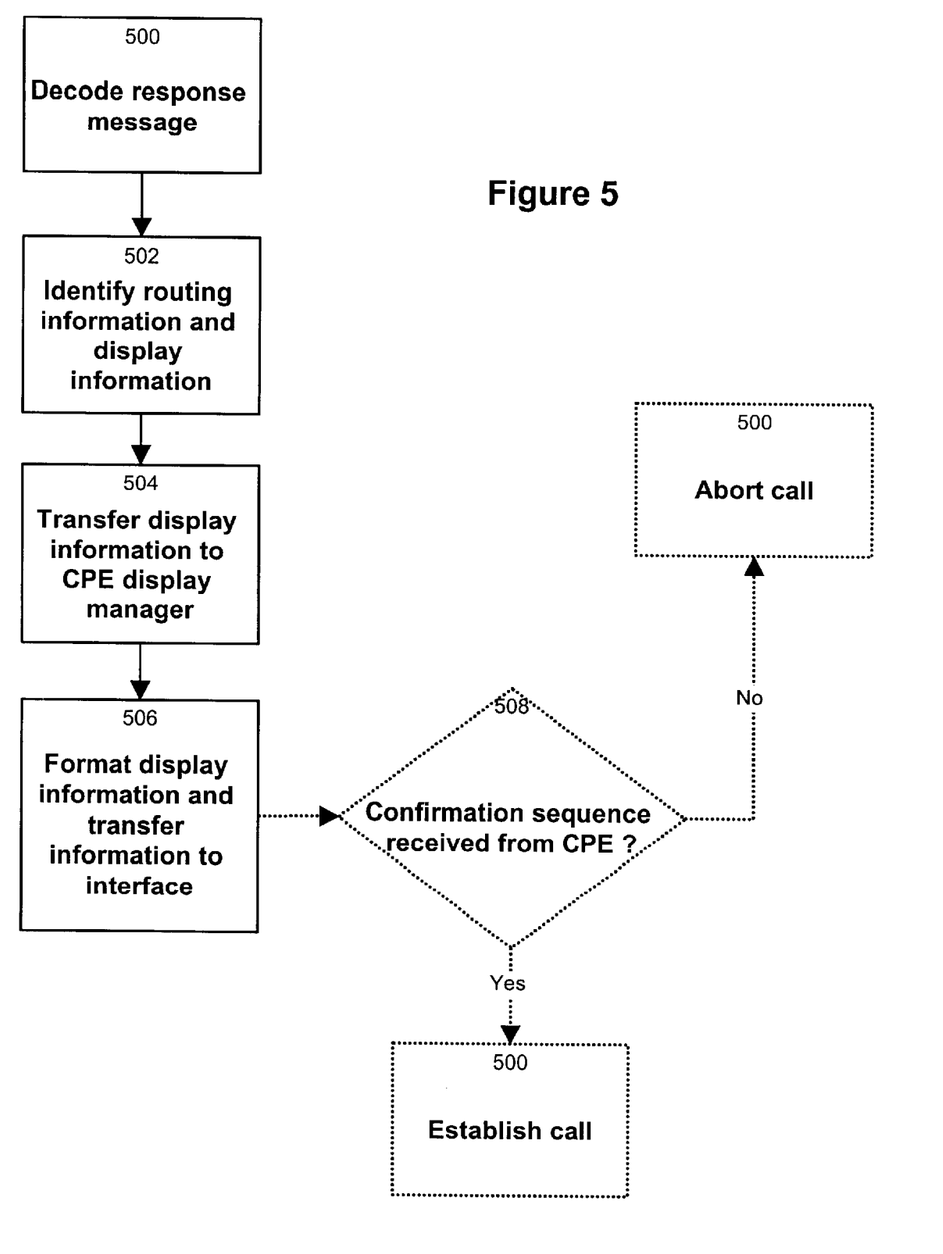
FIG. 5 is a flow chart illustrating the events occurring in the central office switch when a response message from the service control point is received.

As illustrated at FIG. 5, the AIN response formulated by the SCP 104 is received by central office switch 101 as the response to the query previously issued. The switch 101 presents the received message to the AIN response processor 204 which decodes the response at step 500 and identifies the routing information and the display information at step 502. The routing information is handled as specified in GR-1298. The display information is transferred to the CPE display manager 202 at step 504 which is responsible to control the information presented to the caller. Based on the capabilities and protocol supported by the terminal 105, the CPE display manager 202 formats the information received from the service activated on SCP 104 and sends it to the CPE interface 201 as shown at step 506. This interface sends the information into data link 108 (Please refer to FIG. 1) where it will be received by terminal 105. This link is shown as a separate channel in FIG. 1 although in practice it need not be a separate physical channel. After completing the processing of the SCP response, the switch 101 has established a telephone call with appropriate called party (e.g., terminal 106) and the display of terminal 105 was updated with the appropriate display information.

Alternatively, the service activated in the SCP may be more sophisticated and require an explicit information exchange or confirmation with the caller. Most preferably, this is effected through SCP interaction. The entered digits on the CPE 102 (or lack of digits within a certain time period) are relayed from the central office switch 101 to the SCP that decided what to do with the call. If the subscriber service profile in the database 404 indicates that call confirmation is to be enforced, and the dialed digits do not correspond to confirmation data, then the SCP aborts the call. Otherwise the call is allowed to proceed. A possible variant of this process is illustrated in FIG. 5. The variant consists of delegating call confirmation decisions to the central office switch 101. Here, the response message sent by the SCP 104 would need to include some form of indicator as to whether call confirmation is enforced for this subscriber. If confirmation is required by the user before the call is allowed to proceed, the processor 204 enters a wait state 508 and observes the channel 107 to determine if a confirmation sequence has been entered by the caller on the CPE 105. If no confirmation is issued within a predetermined time period the call procedure is aborted, as shown at step 510. Otherwise, the call is established as shown at step 512.

In general, the services offered to the subscriber under the present inventive concept may or may not be related to establishing a call. For example, the caller may dial a vertical access code which has been provisioned in the central office switch 101 as requiring SCP processing. This invention also provides for the required capabilities to conduct the interaction with the caller using display indications. As the SCP 104 receives the AIN query from switch 101, a service which requires interaction with the calling party may be activated. In an AIN network, these interactions are managed by exchanging TCAP messages between the switch and the SCP while maintaining an open TCAP transaction. The SCP 104 can direct the SSP 101 to provide or collect information from the caller by sending message Send_To_Resource to the SSP 101 as described in GR-1298 and GR-1299. The SSP 101 handles the user interface (announcement, tones, digit collection) and communicates the result to the SCP 104 using messages Resource_Clear and Call_Info_From_Resource.

This invention allows the SCP 104 to include in the TCAP message which carries the SCP 101 instructions (usually a Send_To_Resource) a new parameter or parameter Display_Text for the purpose of carrying information to be displayed by the switch 101 while engaging in an information exchange with the caller. This information could also be exchanged using separate messages or additional TCAP components in the current message.

The SCP adds the display information in its AIN response message. This message is delivered to the switch 101. The switch presents the encoded TCAP message to the AIN SCP interface 203 which decodes it and forwards it to the AIN response processor 204. The AIN response processor extracts the display information from the other information supplied by the SCP 104 and transmits this display information to the CPE display manager 202 which processes it as explained above. As a result of this processing the display of the terminal 105 is updated. The SCP 104 requested interaction as supported in GR-1298 is then performed. These actions could be playing an announcement or a tone and collecting digits. If several exchanges are conducted during the interaction, the SCP 104 may request several times the display of display information. The capability for AIN services to provide both display and audible indications to the caller can be used by those skilled in the art to implement several services. Some of these services may be used when telephone calls are established (e.g., such as rate confirmation). Other services can be used outside of call procedures (e.g., user profile update in a single number service). When this capability is used during interaction prior to establishing a telephone call, the SCP 104 may also make use of the capability described above for supplying additional display information when providing the routing information to central office switch 101.

In the examples provided above the display information delivered to the CPE 105 resides in the database 404 of the SCP 104. The advantage of this arrangement is that the information is stored at a single location and may be distributed to the subscribers of the network as required. One drawback, however, resides in the requirement of delivering large blocks of data to different subscribers which may not be desirable in instances where the signaling network is overloaded, or may not be practical due to protocol limitations. To avoid this difficulty the data stored in the SCP 104 may be distributed either fully or in part in the local databases of the central office switches 101. The database 404 would, thus, contain the service display elements which could be invoked by the SCP 104 to provide display services to the caller. Thus, during an interaction with the caller, the response formulated by the SCP 104 to the central office switch 101 would provide a key allowing the local database to generate the specific information to be displayed to the caller. This approach reduces the amount of traffic between the central office switches and the SCP 104, however, as mentioned earlier requires at least some of the information to reside in the local database of the central office switch. A possible compromise is to store all the database information relating to subscribers in the database of the SCP 104 to avoid the necessity of maintaining large amounts of data in several central office switches. The advantages of having this type of information stored in a single location is, among other things ease of updating. Thus, when a particular subscriber changes his/her profile and wishes to access other services or a new subscriber is connected to the network in which case his name and associated telephone number are added to the database, a single database location needs to be updated instead of a multiplicity of smaller databases. On the other hand, information that is less susceptible to change over time, such as graphical display elements as marketing logos, may be stored in the local databases. In those instances, the response formulated by the SCP 104 contains both the information that is displayed on the CPE 105 or used in the associated central office switch to invoke a certain procedure, and a key allowing the local database of the central office switch 101 to retrieve and extract information that again can be either displayed on the CPE 105 or used to perform a certain task that does not require any displaying of information to the caller.

The above description of a preferred embodiment should not be interpreted in any limiting manner since variations and refinements can be made without departing from the spirit of the invention. The scope of the invention is defined in the appended claims and their equivalents.

What is claimed is:

1. A method for delivering selected information associated with a called party to a caller terminal equipment unit, the called party being associated to a number dialed at the caller terminal equipment unit, said caller terminal equipment unit being connected to an AIN network that includes:

a central office switch having service switching point capability to which the caller terminal equipment unit is connected, the central office switch being capable of exchanging data over a certain data transport path with the caller terminal equipment unit; and a service control point connected to the central office switch and capable of exchanging data with said service switching point, said service control point including a database for storing a list of identifiers of terminal equipment units and data elements related to the identifiers of terminal equipment units; said method comprising:

a) monitoring at said central office switch a certain condition of said caller terminal equipment unit to detect a request for delivering certain data to said caller terminal equipment unit through AIN interaction, the request originating from the caller terminal equipment unit, the certain data being associated with a called party with which the caller terminal equipment unit wishes to establish a connection;

b) formulating at said central office switch a query request in accordance with said request for delivering certain data, said query request including the number dialed at the caller terminal equipment unit, said query request further including a portion constituting an identifier of the caller terminal equipment unit;

c) forwarding said query request to said service control point;

d) searching said list of identifiers of terminal equipment units to locate the identifier of the caller terminal equipment unit included in said query request;

e) extracting from said database a data element corresponding to the identifier of the caller terminal equipment unit, said data element being indicative of a requirement to invoke a call confirmation procedure at said central office switch;

f) processing said query request at said service control point and generating a response message containing the certain data associated with the called party and the data element extracted at e);

g) forwarding said message to said central office switch; and h) delivering to said caller terminal equipment unit over the certain data transport path the certain data.

2. A method as defined in claim 1, wherein said certain data associated with the called party is adapted to be displayed on a display screen of said caller terminal equipment unit.

3. A method as defined in claim 1, wherein said certain data associated with the called party is a set of instructions executable by a processor.

4. A method as defined in claim 3, wherein said set of instructions is executable by a processor residing in said caller terminal equipment unit.

5. A method as defined in claim 1, wherein said database at said service control point includes a list of numbers of terminal equipment units associated with respective subscriber names, said method comprising searching said list of numbers of terminal equipment units to locate the number of a destination terminal equipment unit with which said caller terminal equipment unit wishes to establish a connection, and extracting from said database a data element representative of a name of the subscriber associated with the destination terminal equipment unit with which said caller terminal equipment unit wishes to establish a connection, and including said data element in said response message.

6. A method as defined in claim 1, comprising upon reception of said data element at said central office switch, monitoring a condition of said caller terminal equipment unit to detect data indicative of intention by a user of the caller terminal equipment unit to complete a call, upon reception of said data indicative of intention by the user to complete a call, effecting a procedure to complete the call, upon absence of said data indicative of intention by the user to complete a call during a predetermined time period aborting a call establishment.

7. A method as defined in claim 1, wherein the data associated to the called party delivered to said caller terminal equipment includes billing information.

8. An AIN telephone signaling network permitting delivery of information associated to a called party to a caller terminal equipment unit, the called party being associated to a number dialed at the caller terminal equipment unit, said AIN telephone signaling network, comprising:

a central office switch having a service switching point capability of AIN interaction;

a plurality of terminal equipment units;

a plurality of data transport paths permitting exchange of data between respective ones of said plurality of terminal equipment units and said central office switch; and a service control point connected to said central office switch and capable of exchanging data with said central office switch, said service control point including a database for storing a list of identifiers of terminal equipment units and data elements related to the identifiers of terminal equipment units;

said central office switch being operative for monitoring said terminal equipment units for detecting a certain condition indicative of a request for receiving certain data, the request originating from a caller terminal equipment unit, the certain data being associated with a called party with which a user of the caller terminal equipment unit wishes to establish a connection;

when said central office switch detects the certain condition at a certain caller terminal equipment unit, said central office switch being operative for formulating a query request to said service control point, said query request including a telephone number dialed at the caller terminal equipment unit, said query request further including a portion constituting an identifier of the caller terminal equipment unit;

said service control point being operative for:

a) searching said list of identifiers of terminal equipment units to locate the identifier of the caller terminal equipment unit included in said query request;

b) extracting from said database a data element corresponding to the identifier of the caller terminal equipment unit, said data element being indicative of a requirement to invoke a call confirmation procedure at said central office switch;

c) processing said query request and generating a response message including the certain data associated to the called party and the data element extracted in b); and d) transmitting the response message generated in c) to said central office switch; and said central office switch being operative for processing said message and delivering to the certain caller terminal equipment unit the certain data associated to the called party over the data transport path associated with the certain caller terminal equipment unit.

9. An AIN telephone signaling network as defined in claim 8, wherein the certain data associated to the called party and delivered to the certain caller terminal equipment unit is capable of being displayed on a display screen of the certain caller terminal equipment unit.

10. An AIN telephone signaling network as defined in claim 8, wherein the certain data associated to the called party includes a set of instructions executable by a processor.

11. An AIN telephone signaling network as defined in claim 10, wherein said set of instructions are executable by a processor residing in the certain caller terminal equipment unit.

12. An AIN telephone signaling network as defined in claim 8, wherein said database at said service control point includes a list of telephone numbers of terminal equipment units associated with respective subscriber names, said service control point being operative for searching said list of telephone numbers of terminal equipment units to locate the identifier of a destination terminal equipment unit with which the user of the certain caller terminal equipment unit wishes to establish a connection, and extracting from said database a data element representative of a name of the subscriber associated with the destination terminal equipment unit with which the user of the certain caller terminal equipment unit wishes to establish a connection, and including said data element in said response message.

13. An AIN telephone signaling network as defined in claim 8, said AIN telephone signaling network being operative to monitor a condition of the certain caller terminal equipment unit to detect data indicative of intention by the user of the certain caller terminal equipment unit to complete a call, upon reception of the data indicative of intention by the user of the certain caller terminal equipment unit to complete a call, said AIN telephone signaling network being operative for effecting a procedure to complete a call and upon absence of the data indicative of intention by the caller at the certain caller terminal equipment unit to complete a call during a predetermined time period said AIN telephone signaling network being operative for aborting a call establishment.

14. An AIN telephone signaling network as defined in claim 8, wherein the data associated to the called party delivered to the certain caller terminal equipment unit includes billing information.

15. A method for displaying a subscriber name associated with a remote telephone instrument on a caller telephone set, the caller telephone set including a display screen, the remote telephone instrument being associated to a number dialed at the caller telephone set, the caller telephone set being connected to an AIN type network that includes:
   a central office switch having service switching point capability to which the caller telephone set is connected, the central office switch being capable of exchanging data over a certain data transport path with the caller telephone set; and
   a service control point capable of exchanging data with said central office switch;
   said method comprising:
   a) monitoring at the central office switch the occurrence of a request originating from the caller telephone set to receive a subscriber name associated with a certain remote telephone instrument, the request from the telephone set including a data element sent by the caller telephone set to said central office switch over said certain data transport path that includes an identifier associated with the certain remote telephone instrument;
   b) formulating at said central office switch a query request in response to said request from the caller telephone set, said query request including an identifier associated to the caller telephone set and the identifier of the certain remote telephone instrument;
   c) forwarding said query request to said service control point;
   d) receiving said query request at said service control point, said service control point including a database containing a plurality of identifiers of telephone instruments associated to corresponding subscriber names and to data elements indicative of a requirement to invoke a call confirmation procedure;
   e) searching said database to locate an identifier corresponding to the identifier of the certain remote telephone instrument;
   f) extracting from said database a subscriber name corresponding to the identifier associated with the certain remote telephone instrument;
   g) searching said list of identifiers of terminal equipment units to locate the identifier in said query request associated to the caller telephone set;
   h) extracting from said database a data element corresponding to the identifier associated to the caller telephone set, said data element being indicative of a requirement to invoke a call confirmation procedure at said central office switch;
   i) formulating a response message including data representative of the subscriber name associated with the certain remote telephone instrument and the data element indicative of a requirement to invoke a call confirmation procedure associated with the caller telephone set;
   j) forwarding said message to said central office switch;
   k) delivering to the telephone set over the certain data transport path the subscriber name associated with the certain remote telephone instrument; and
   l) displaying on the display screen of the caller telephone set the subscriber name associated with the certain remote telephone instrument.

16. A method as defined in claim 15, comprising receiving digits dialed at the caller telephone set, the digits constituting the identifier of the certain remote telephone instrument.

17. A method as defined in claim 15, comprising monitoring said caller telephone set after the subscriber name associated with the certain remote telephone instrument has been displayed on said display screen to recognize a condition indicative that a call to the certain remote instrument is to be established.

18. A method as defined in claim 17, comprising monitoring said caller telephone set for a predetermined time period, if no condition that a call to the certain remote telephone instrument is to be established has been recognized during said predetermined time period then causing call establishment to abort.

19. A method as defined in claim 17, comprising establishing a call to the certain remote telephone instrument upon recognition of a condition indicative of a desire of a subscriber at the caller telephone set to establish a call with the certain remote telephone instrument.

20. A system for displaying a subscriber name associated with a remote telephone instrument on a caller telephone set that includes a display screen, the remote telephone set being associated to a number dialed at the caller telephone set, said caller telephone set being connected to an AIN type network that includes:
   a central office switch having service switching point capability to which the caller telephone set is connected, said central office switch being capable of exchanging data over a certain data transport path with the caller telephone set; and
   a service control point capable of exchanging data with said central office switch;
   said system comprising:
   a unit for monitoring at said central office switch occurrence of a request originating from the caller telephone set to receive a subscriber name associated with a certain remote telephone instrument, the request from the caller telephone set including data sent by the caller telephone set to said central office switch over said certain data transport path that includes an identifier of the certain remote telephone instrument;

a unit for formulating at said central office switch a query request in response to said request from the caller telephone set, said query request including an identifier of the caller telephone set and the identifier of the certain remote telephone instrument;

a unit for forwarding said query request to said service control point;

a unit for receiving said query request at said service control point, said service control point including a database containing a plurality of identifiers of telephone instruments related to corresponding subscriber names and to data elements indicative of a requirement to invoke a call confirmation procedure;

a unit for searching said database to locate an identifier corresponding to the identifier of the certain remote telephone instrument;

a unit for extracting from said database a subscriber name corresponding to the identifier associated with the certain remote telephone instrument;

a unit for searching said list of identifiers of terminal equipment units to locate the identifier in said query request associated to the caller telephone set;

a unit for extracting from said database a data element corresponding to the identifier associated to the caller telephone set, said data element being indicative of a requirement to invoke a call confirmation procedure at said central office switch;

a unit for formulating a response message including data representative of the subscriber name associated with the certain remote telephone instrument and the data element indicative of a requirement to invoke a call confirmation procedure associated with the caller telephone set; and a unit for forwarding said message to said central office switch;

said central office switch being operative to deliver to the caller telephone set over the certain data transport path the subscriber name associated with the certain remote telephone instrument and causing the subscriber name associated with the certain remote telephone instrument to be displayed on the display screen of the caller telephone set.

21. In combination:

a caller terminal equipment unit associated to a user, the user being a subscriber of a service that provides selected information about a called party based on the number dialed by the user of the caller terminal equipment unit, the number dialed being associated to the called party;

a switch for use in a telephone network, said switch having a service switching point capability for AIN interaction, said switch being capable of exchanging data over a certain data transport path with a certain caller terminal equipment unit at which a call session with a destination terminal equipment unit associated with a called party can be originated; and a service control point connected to said switch and capable of exchanging data with said switch, said service control point including a database for storing a list of identifiers of terminal equipment units and data elements related to the identifiers of terminal equipment units;

said switch being responsive to an AIN trigger observed on the data transport path, the trigger being indicative of a request originating from the caller terminal equipment unit for delivering certain data to the certain caller terminal equipment unit through AIN interaction, the certain data being associated with a destination terminal unit of the call session for formulating a query request to said service control point, said query request including a number dialed at the caller terminal equipment unit, said query request further including a portion constituting an identifier of the caller terminal equipment unit;

said service control point being responsive to said query request for:
  a) searching said list of identifiers of terminal equipment units to locate the identifier of the caller terminal equipment unit included in said query request;
  b) extracting from said database a data element corresponding to the identifier of the caller terminal equipment unit, said data element being indicative of a requirement to invoke a call confirmation procedure at said central office switch;
  c) generating a response message containing the certain data and the data element extracted in b); and
  d) transmitting said response message to said switch; and said switch being responsive to said response message for delivering the certain data associated with a called party, to the certain caller terminal equipment unit over the certain data transport path.

22. A combination as defined in claim 21, wherein the certain data associated with the called party can be visually displayed on the certain caller terminal equipment unit.

23. A combination as defined in claim 21, wherein said switch delivers the certain data associated with the called party to the certain caller terminal equipment unit while a call session is in progress and involves the certain caller terminal equipment unit.

24. A combination as defined in claim 21, wherein said switch delivers the certain data associated with a called party to the certain caller terminal equipment unit while no call session involving the certain caller terminal equipment unit is in progress.

25. A combination as defined in claim 21, wherein the response data contains an identifier of a destination terminal equipment involved in the call session processed by said switch.

26. A combination as defined in claim 25, wherein the identifier of a destination terminal equipment involved in the call session processed by said switch is a name of a subscriber associated with the destination terminal equipment.

27. A combination as defined in claim 21, wherein the response data is billing information relative to the call session processed by said switch.

28. A combination as defined in claim 21, wherein the certain data includes a set of instructions executable by a processor at the certain caller terminal equipment unit.

* * * * *